US010350596B2

(12) United States Patent
Seddon et al.

(10) Patent No.: US 10,350,596 B2
(45) Date of Patent: Jul. 16, 2019

(54) MICRO-REAGENT HANDLER AND CARTRIDGE ASSEMBLY

(71) Applicant: Institute Of Technology Tallaght, Dublin (IE)

(72) Inventors: Brian Seddon, Dublin (IE); Ronan O'Reilly, Dublin (IE); Eithne Dempsey, Dublin (IE); James Hayes, Dublin (IE); Baljit Singh, Dublin (IE)

(73) Assignee: Technological Uniersity Dublin, Dublin (IE)

( * ) Notice: Subject to any disclaimer, the term of this patent is extended or adjusted under 35 U.S.C. 154(b) by 289 days.

(21) Appl. No.: 14/442,771

(22) PCT Filed: Nov. 14, 2013

(86) PCT No.: PCT/EP2013/073876
§ 371 (c)(1),
(2) Date: May 14, 2015

(87) PCT Pub. No.: WO2014/076207
PCT Pub. Date: May 22, 2014

(65) Prior Publication Data
US 2015/0336099 A1 Nov. 26, 2015

(30) Foreign Application Priority Data
Nov. 14, 2012 (EP) ..................... 12192551

(51) Int. Cl.
*B01L 3/00* (2006.01)
*B32B 3/26* (2006.01)
(Continued)

(52) U.S. Cl.
CPC ..... *B01L 3/50273* (2013.01); *B01L 3/502738* (2013.01); *B01L 3/52* (2013.01);
(Continued)

(58) Field of Classification Search
CPC ..... B01L 2300/0887; B01L 2400/0481; B01L 3/50273; B01L 3/561; B01L 3/567;
(Continued)

(56) References Cited

U.S. PATENT DOCUMENTS 6,946,937 B2  9/2005  Donce
8,691,592 B2  4/2014  Chen
(Continued)

FOREIGN PATENT DOCUMENTS

DE  102010015161 A1  10/2011
DE  102011003856 A1  8/2012
WO  2008076395 A2  6/2008

OTHER PUBLICATIONS

International Search Report and Written Opinion dated Feb. 11, 2014 in corresponding International Application No. PCT/EP2013/073876.
(Continued)

*Primary Examiner* — Sally A Merkling
(74) *Attorney, Agent, or Firm* — The Law Office of Michael E. Kondoudis

(57) ABSTRACT

A planar micro-reagent cartridge comprises a base layer having a fluid receiving cavity formed in a top surface thereof and a fluid disposed within the cavity, and intermediate layer and a top layer. The intermediate membrane layer is bonded to the base layer to seal the fluid receiving cavity and form a fluid reservoir pump chamber. The intermediate layer comprises a resiliently deformable flexible region that overlies the fluid receiving cavity and is configured to be depressed in response to application of pressure, and a rupturable valve region that overlies the fluid receiving cavity. A top layer is bonded to the intermediate layer, the top layer having an opening that exposes the deformable flexible region of the intermediate membrane layer and at least one channel that together with the intermediate mem-
(Continued)

brane layer forms a fluid conduit having an inlet in fluid communication with the rupturable valve region of the intermediate layer. In use, depression of the deformable flexible region actuates the fluid reservoir pump chamber to rupture the rupturable valve region and pump fluid into the capillary.

17 Claims, 9 Drawing Sheets

(51) Int. Cl.
*B32B 37/14* (2006.01)
*B32B 37/18* (2006.01)
*F04B 43/02* (2006.01)
*F04B 43/04* (2006.01)
*B01L 3/02* (2006.01)

(52) U.S. Cl.
CPC ............... *B01L 3/561* (2013.01); *B01L 3/567* (2013.01); *B32B 3/266* (2013.01); *B32B 37/144* (2013.01); *B32B 37/18* (2013.01); *F04B 43/02* (2013.01); *F04B 43/043* (2013.01); *B01L 3/021* (2013.01); *B01L 2200/06* (2013.01); *B01L 2200/12* (2013.01); *B01L 2300/08* (2013.01); *B01L 2300/0809* (2013.01); *B01L 2300/0874* (2013.01); *B01L 2300/0887* (2013.01); *B01L 2300/123* (2013.01); *B01L 2400/0406* (2013.01); *B01L 2400/049* (2013.01); *B01L 2400/0481* (2013.01); *B01L 2400/06* (2013.01); *B01L 2400/0683* (2013.01); *B32B 2307/546* (2013.01); *B32B 2439/40* (2013.01)

(58) Field of Classification Search
CPC .. B01L 3/52; B01L 3/502738; B01L 2200/06; B01L 2400/0406; B01L 2300/08; B01L 2439/40; B01L 2400/06; B01L 2200/12; B01L 2300/0809; B01L 2300/0874; B01L 2400/049; B01L 2400/0683; B01L 3/021; B01L 2300/123; F04B 43/02; F04B 43/043; B32B 37/18; B32B 37/144; B32B 3/266; B32B 2307/546
See application file for complete search history.

(56) References Cited

U.S. PATENT DOCUMENTS

| | | | |
|---|---|---|---|
| 2002/0114715 | A1 | 8/2002 | Yoon et al. |
| 2005/0180891 | A1* | 8/2005 | Webster ............. B01L 3/50273 422/505 |
| 2008/0216937 | A1 | 9/2008 | Middlesworth et al. |
| 2009/0134046 | A1* | 5/2009 | Breidenthal ........ B01F 11/0045 206/221 |

OTHER PUBLICATIONS

Hihoud et al, Bruce—Electromagnetic Actuated Pin Puller, ACTUATOR 2012, 13th International Conference on New Actuators, Jun. 18-20, 2012, Bremen, Germany.

* cited by examiner

MICRO-REAGENT HANDLER AND CARTRIDGE ASSEMBLY

BACKGROUND TO THE INVENTION

Existing micro-reagent delivery systems require external actuators such as pneumatic pumps, syringe pumps, thermo-pneumatic or micro-centrifuge devices for efficient operation. While these approaches for fluid actuation are effective they appreciably increase instrumentation foot print, mass and often require planar and stable surfaces to operate effectively. Furthermore, their energy consumption requirements are not conducive to prolonged battery life and as such operate using mains power. As a consequence, these micro-reagent delivery systems are typically not suitable for mobile or handheld chemical diagnostic devices. Examples of systems employing these methods are many including Gyros (www.gyros.com), Achiralabs (www.achiralabs.com) etc.

United States Patent Application No: US2005/0180891 (FIG. 12-14) discloses a miniaturised fluid delivery and analysis system comprising an upper substrate and a lower substrate separated by a flexible intermediate layer, an open reservoir, a reaction chamber, a pump and a hole formed in the second substrate to allow for pumping of fluid between the reservoir and reaction chamber. The system is designed to connect with an external reservoir of reagent fluid prior to use, and as such is designed as an open system without any barrier between the open reservoir and the reaction chamber. This means that reagents cannot be stored on board the device thus restricting "out of laboratory" applications.

It is an object of the invention to overcome at least one of the above-referenced problems.

STATEMENTS OF INVENTION

The cartridge of the present invention circumvents drawbacks associated with reagent devices by removing the requirement for traditional actuators and replacing them with a novel touch pump fluid injector. This proposed system based on membrane touch fluidics is small and light weight with very low energy consumption. It is therefore ideal for use in chemical diagnostic devices that must be portable for in field applications. The device of the invention also incorporates a sealed chamber adapted to contain reagent that is separated from a reaction chamber by a rupturable valve region, in which manual/automated actuation of the fluid pump causes the rupturable valve region disposed between the sealed chamber and reaction chamber to rupture thereby establishing fluid communication between the two chambers. This enables the device to be formed with fluid reagent stored within the device, and obviates the need to dispense fluid reagent from an external reservoir into the device prior to use. In effect, the device of the invention provides a self-contained microfluidic pump and reaction chamber that can be actuated without the need for additional reagent reservoirs or pumps.

Broadly, the invention provides a reagent cartridge, that is capable of storing and pumping small volumes (i.e. less than 500 µL) of reagent (e.g. in liquid form) from a first location on the cartridge to a second location on the cartridge. The cartridge is formed as a planar laminate structure of one or more layers that are adhered together, and provide a reagent storage chamber, a conduit (e.g. capillary channel), and a pump for pumping fluid from the storage chamber to a capillary channel. The cartridge comprises a base layer that comprises fluid storage cavity (otherwise referred to as a receiving cavity), an intermediate polymeric membrane that is bonded to the base layer and closes the cavity (forming a fluid reservoir pump chamber), and a top layer that is bonded to the intermediate membrane. The intermediate membrane includes a resiliently deformable flexible region that overlies the fluid receiving cavity such that application of pressure to the flexible region causes an increase of pressure within the fluid reservoir pump chamber (i.e. it acts as a pressure pad to effect a pumping action), and a rupturable valve region that also overlies the fluid receiving cavity. The top layer comprises a channel or chamber that together with the membrane layer forms a fluid conduit, for example a capillary channel leading to a reaction chamber. The fluid conduit has an inlet that abuts the rupturable valve region formed in the intermediate membrane layer, such that an increase of pressure in the fluid reservoir pump chamber causes the rupturable valve region to rupture and effects movement of fluid from the pump chamber to the fluid conduit. (FIGS. 1, 3 and 11).

Accordingly, in a first aspect, the invention provides a micro-reagent cartridge comprising;
 a base layer having a fluid receiving cavity formed in a top surface thereof and a reagent (i.e. powder solids, liquids or gases) disposed within the cavity;
 an intermediate layer bonded to the base layer to seal the reagent receiving cavity and form a fluid reservoir pump chamber, the intermediate layer comprising a resiliently deformable flexible region that overlies the fluid receiving cavity and is configured to be depressed in response to an application of pressure, and a rupturable valve region that overlies the fluid receiving cavity; and
 a top layer bonded to the intermediate layer, the top layer having an opening that exposes the deformable flexible region of the intermediate membrane layer and at least one channel that together with the intermediate membrane layer forms a fluid conduit having an inlet in fluid communication with the rupturable valve region of the intermediate layer, wherein depression of the deformable flexible region actuates the fluid reservoir pump chamber to rupture the rupturable valve region and pump fluid into the fluid conduit.

Preferably, the fluid conduit comprises a capillary channel. Ideally, the fluid conduit comprises a capillary channel in fluid communication with a further fluid receiving chamber, for example a reaction chamber.

A micro-reagent cartridge of the invention comprising;
 a base layer having a fluid receiving cavity formed in a top surface thereof and a reagent (powder solids, liquids or gases) disposed within the cavity;
 an intermediate membrane layer bonded to the base layer to seal the reagent receiving cavity and form a fluid reservoir pump chamber, the intermediate layer comprising a resiliently deformable flexible region that overlies the fluid receiving cavity and is configured to be depressed in response to an application of pressure, and a hole that overlies the fluid receiving cavity; and
 a top layer bonded to the intermediate layer, the top layer having an opening that exposes the deformable flexible region of the intermediate membrane layer and at least one channel/chamber that together with the intermediate membrane layer forms a reaction chamber, ideally a capillary channel, having an inlet in fluid communication with the hole of the intermediate layer, wherein depression of the deformable flexible region actuates the fluid reservoir pump chamber to pump fluid into the reaction chamber through the hole in the intermediate membrane layer.

The cartridge of the invention has a number of advantages. It is of relatively simple construction, typically comprising only three separate components. It is capable of pumping very small volumes of fluid around a mesofluidic system in a simplified manner that in one embodiment may be actuated manually by a user, simply using their finger or a micro-stylus. In addition, it is a small and easy to manipulate device which is relatively cheap to manufacture and which is self-contained insofar as it contains the reagent fluid required to perform an analytical process. This is in contrast with the device of US2005/0180891 which comprises an open reagent reservoir.

in this invention liquid reagents necessary for analytical application are stored within closed reservoirs/cavities and internally on the fluidic cartridge system. For its operation the cartridge does not require reagent fluids to be dispensed onto the card by automatic means or manual injection. These distinguishable features enable the construction of on-card reagent cartridge fluidics for low cost, single-use mobile applications such as point-of-care locations. The reservoir remains closed to the environment at all time before and during fluidic operations. This obviates potential contamination of fluidic lines, as well as errors associated with open reservoir dispensing. It also enables in-field operation, alleviating the requirement for manual reagent handling/loading steps.

In this invention the reagent reservoir and pump structure are integrated in one unit (fluid reservoir pump chamber). This arrangement allows the efficient transmission of fluid reagent from the reservoir to the reaction chamber without the need for a separate pumping device in the flow line between the reservoir and the reaction chamber. This novelty limits the extent of fluidic-line surfaces which give rise to problematic non-specific binding of reagents.

In this specification, the term "planar" should be understood to mean that the cartridge is generally flat and thin, typically less than 30 mm in thickness, and preferably has dimensions similar to that of a conventional credit card.

Suitably, the intermediate layer comprises a rupturable valve region spaced apart from the deformable flexible region and which abuts the inlet of the fluid conduit formed in the top layer, the rupturable valve region being configured to rupture upon actuation of the fluid reservoir pump chamber. Thus, actuation of the fluid reservoir pump chamber causes an increase in pressure within the fluid reservoir pump chamber, which causes the valve region in the intermediate layer to rupture. A single-stroke pumping mechanism is required to transmit fluid reagents from the closed reservoir to the fluid conduit in the top layer.

In another embodiment, the fluid conduit comprises an outlet, and in which the resiliently deformable region is configured to retract upon removal of pressure thereby causing fluid to move from the fluid conduit into the fluid reservoir pump chamber.

Typically, the liquid receiving cavity has a volume of less than 1 ml, 900 µl, 800 µl, 700 µl, 600 µl, 500 µl, 400 µl, 300 µl, 200 µl, 100 µl, 50 µl, 10 µl, 5 µl, or 1 µl. Suitably, the fluid receiving cavity has a volume of from 1-1000 µl, 50-1000 µl, 50-900 µl, 50-800 µl, 50-700 µl, 50-600 µl, 50-500 µl, 50-400 µl, 50-300 µl, 50-200 µl. In one embodiment, the fluid receiving cavity has a volume of from 0.1-100 µl, 0.1-10 µl, or 0.1-100 µl. Preferably, the fluid receiving cavity has a volume of from 100-1000 µl, 100-900 µl, 100-800 µl, 100-700 µl, 100-600 µl, 100-500 µl, 100-400 µl, 100-300 µl, and 100-200 µl.

Typically, the fluid reservoir pump chamber has a depth of less than 10 mm, 9 mm, 8 mm, 7 mm, 6 mm, 5 mm, 4 mm, 3 mm, 2 mm, 1 mm or 0.5 mm. Suitably, the fluid reservoir pump chamber has a depth of 0.1 mm to 5 mm.

The cartridge is configured such that actuation of the fluid reservoir pump chamber typically pumps 5-100 µl of fluid from the fluid reservoir pump chamber into the capillary channel, suitably at a volume flow rate of 5-20 µl/s or linear flows of 50-200 mm/s.

Typically, the base layer has a depth of less than 10 mm, 9 mm, 8 mm, 7 mm, 6 mm, 5 mm, 4 mm, 3 mm, 2 mm, 1 mm or 0.5 mm. Suitably, the base layer has a depth of 0.5 mm to 5 mm.

Suitably, the base layer is formed of a polymer material. Suitable materials include cellulose polymers, polycarbonates, polyesters such as polyethylene terephthalate, polystyrene, polyimide or the like.

Preferably, the fluid receiving cavity is formed in the base layer by laser etching (laser machining). Alternatively, the base layer is formed by plastic moulding with a pre-formed fluid receiving cavity. The fluid receiving cavity may take any shape, such as cylindrical or cuboid.

The intermediate layer is preferably a membrane layer. Typically, the intermediate layer is formed of polymeric material. Suitable examples include cellulose polymers e.g. acetates or nitro-polymers, polycarbonates, polyesters e.g. polyethylene terephthalate, polyethenes, polystyrenes, polyimides or the like. Typically, the membrane has a thickness of 50-250 µm, 100-250 µm, or 150-250 µm.

Suitably, the resiliently deformable flexible region of the intermediate layer is an area of the layer that overlies the fluid reservoir pump chamber and is recessed compared to the rest of the intermediate layer. Typically, it is recessed by laser etching/machining Thus, the resiliently deformable flexible region has a thickness that is less than the intermediate layer and, as such, provides a region of the layer of increased deformability. In this manner, the flexible region acts as a "touch pad" that can be compressed or depressed to actuate the pump chamber. Typically, the recessed region has a thickness that is from 10-100 µm less than the thickness of the intermediate layer. Actuation of the touch pad may be achieved by the action of a force applied by, for example, a micro-stylus, a user's finger, or by means of external pin actuators such as those operated on electromagnetic principles such as those in "Electromagnetic Actuator" U.S. Pat. No. 6,946,937 B2 and "Electromagnetic Actuated Pin Puller" Actuator 2012 13$^{th}$ International Conference on New Actuators, Germany, June 2012 or via movement of a motorised stage—"Mechanically Actuated Diagnostic Device" PCT/US2007/025699

Suitably, the rupturable valve region of the intermediate layer is a specific locus of the intermediate (membrane) layer that overlies the fluid reservoir pump chamber and that is configured to be ruptured in use by the actuation of the pump chamber. The valve region may comprise a recessed region of the intermediate layer. The recessed region may comprise a polymer plug such a polystyrene (i.e. less than 2 µl), that is added to the recessed region after it has been formed. Alternatively, the rupturable valve region may comprise a hole in the layer that is filled with a polymer plug (i.e. less than 2 µl). All of these separate embodiments provide a localised weakened region in the intermediate layer that is configured to rupture when the pump chamber is actuated. The valve is generally a single-use valve that, once ruptured, cannot be re-used. In other embodiments, a multi-use valve may be employed; examples of suitable multiple-use valves are resealing silicone septum valves. The intermediate layer of the device may be a membrane layer.

Suitably, the top layer is formed of a polymeric material, for example cellulose polymers, polycarbonate, polyethylene terephthalate, polyester, polystyrene, polyimide or the like. An underside of the top layer comprises a channel that together with the top surface of the membrane layer forms a fluid conduit, for example a capillary channel. In this specification, the term "capillary channel" should be understood to mean a specific conduit for the transfer of microliter volumes of reagent (e.g. liquids) from one location on the cartridge to another location on the cartridge. A capillary channel of this invention has dimensions typically of 100s microns depth and 100s µm to 2 mm width. The channel or conduit is of variable length of a few mm to cm. The use of the term "capillary" here implies a surface-acting capillary force and indeed liquid reagent entering this kind of conduit would experience a capillary pull drawing the liquid by an even capillary flow to other parts of the cartridge.

The fluid conduit ideally comprises a capillary channel, that typically has an inlet that abuts the valve region of the membrane layer and an outlet that optionally is in fluid communication with a fluid receiving chamber, for example a reaction chamber or an outlet disposed on a top of the top layer. Thus, in use, when the valve region is ruptured, fluid will flow from the pump chamber into the capillary channel.

In one embodiment of the invention, the intermediate layer comprises at least two valve regions, and the top layer comprises at least two channels that together with the intermediate layer form at least two fluid conduits (for example, capillary channels) each of which is in fluid communication with a rupturable valve region.

Typically, at least two of the layers are attached by means of laminate ultrasonic bonding achieved with such as Branson (Emerson) ultrasonic welders for dry-bonding of plastic films, and in "Elastic laminates and methods of manufacturing same" Patent Application 20080216937.

Alternative methods of bonding the layers include chemical and film adhesive bonding (the latter using adhesive Nitto Denko films, or by means of thermal bonding with, for example, polyethylene laminates typically employed in foil packaging of foodstuffs.

In a preferred embodiment, the micro-reagent cartridge of the invention comprising
  a thin base layer having a liquid receiving cavity formed in a top surface thereof and a liquid disposed within the cavity, the liquid receiving cavity having a volume of less than 1 ml;
  an intermediate polymeric membrane layer attached to the thin base layer to seal the liquid receiving cavity and form a fluid reservoir pump chamber, the intermediate layer overlies the fluid receiving cavity and is configured to be depressed in response to application of pressure, and a valve region that overlies the fluid receiving cavity and is configured to be ruptured in response to actuation of the pump chamber; and
  a top layer bonded to the intermediate layer, the top layer having an opening that exposes the deformable flexible region of the intermediate membrane layer and at least one channel that together with the intermediate membrane layer forms a fluid conduit having an inlet in fluid communication with the rupturable valve region of the intermediate layer, wherein depression of the deformable flexible region actuates the fluid reservoir pump chamber to rupture the rupturable valve region and pump fluid into the fluid conduit.

In an alternative embodiment, the micro-reagent cartridge comprises;
  a thin base layer having a gas receiving cavity formed in a top surface thereof and a gas disposed within the cavity, the gas receiving cavity having a volume of less than 1 ml;
  an intermediate polymeric membrane layer attached to the thin base layer to seal the liquid receiving cavity and form a fluid reservoir pump chamber, the intermediate layer overlies the fluid receiving cavity and is configured to be depressed in response to application of pressure, and a hole that overlies the fluid receiving cavity; and
  a top polymeric layer attached to the intermediate layer, the top layer having an opening that exposes the deformable flexible region of the intermediate membrane layer and at least one channel that together with the intermediate membrane layer forms a fluid conduit having an inlet that abuts the hole in the polymeric membrane to provide fluid communication between the fluid reservoir pump chamber and the fluid conduit.

The invention also relates to an in-vitro diagnostic device comprising a cartridge of the invention. Preferably, the device is a hand-held device. Suitably, the device is configured for bed-side diagnostic applications.

The invention also relates to a method of making a micro-reagent cartridge comprising the steps of:
  providing a base layer having a fluid receiving cavity formed in a top surface thereof and a fluid disposed within the cavity;
  bonding an intermediate membrane layer to the base layer to seal the fluid receiving cavity and form a fluid reservoir pump chamber, the intermediate layer comprising a resiliently deformable flexible region that overlies the fluid receiving cavity and is configured to be depressed in response to application of pressure; and
  bonding a top layer to the intermediate layer, the top layer having an opening that exposes the deformable flexible region of the intermediate membrane layer and at least one channel that together with the intermediate membrane layer forms a fluid conduit having an inlet in fluid communication with the fluid reservoir pump chamber.

The invention also relates to a method of operation of a micro-reagent cartridge of the invention, the method comprising applying pressure to the deformable flexible region of the membrane layer to effect a pumping action and pump fluid from the fluid reservoir pump chamber to the fluid conduit.

The invention also relates to an alternative method of operation of a micro-reagent cartridge of the invention, wherein the fluid conduit has an outlet exposed on a surface of the top layer of the cartridge, the method comprising the steps of applying an amount of liquid on the top layer of the cartridge adjacent the outlet, and applying pressure to the deformable flexible region of the membrane layer to effect a pumping action and pump gas from the fluid reservoir pump chamber to the fluid conduit, and releasing pressure from the deformable flexible region of the membrane layer to generate a low-pressure space or partial vacuum within the fluid reservoir pump chamber, wherein the vacuum in the fluid reservoir pump chamber draws the liquid on the top layer of the cartridge into the fluid conduit.

The invention also relates to a planar micro-fluidic pump, forming part of a micro-reagent cartridge of the invention, and comprising;

a base layer having a fluid receiving cavity formed in a top surface thereof and a fluid disposed within the cavity;

an intermediate membrane layer bonded to the base layer to seal the fluid receiving cavity and form a fluid reservoir pump chamber, the intermediate layer comprising a resiliently deformable flexible region that overlies the fluid receiving cavity and is configured to be depressed in response to application of pressure, and a rupturable valve region that overlies the fluid receiving cavity;

wherein depression of the resiliently deformable flexible region actuates the fluid reservoir pump chamber to rupture the rupturable valve region and pump fluid out of the fluid receiving cavity through the ruptured valve.

The invention also relates to a method of making a micro-reagent cartridge comprising the steps of:

providing a planar microfluidic pump of the invention; and bonding a top layer to the intermediate layer of the planar microfluidic pump, the top layer having an opening that exposes the deformable flexible region of the intermediate membrane layer and at least one channel/chamber that together with the intermediate membrane layer forms a reaction chamber (ideally a capillary channel) having a inlet in fluid communication with the fluid reservoir pump chamber, In the embodiments described herein, the resiliently deformable flexible region is described as being part of the intermediate layer, in which the top layer comprises a hole through which the resiliently deformable flexible region can be accessed for depression thereof. However, it will be appreciated that the resiliently deformable flexible region may be formed in the top layer and the intermediate layer may comprise a hole underlying the flexible region such that depression of the flexible region in the top layer effects an increase in pressure in the fluid receiving cavity.

In the embodiments described herein, the top layer comprises a capillary channel that optionally fluidly connects with a reaction chamber. However, it will be appreciated that the capillary channel is in some embodiments optional, in which case the rupturable valve may be in direct fluid communication with a reaction chamber or another type of fluid conduit.

In this specification, the term "fluid" should be understood to include not only gas and liquid, but also powders that have fluid properties, i.e. the ability to flow.

Single-use, PoP style valve components are included in every type of membrane touch device. There are several variations of the valve. All are principally manufactured by laser machining techniques of polymer films to generate a thin deformable and inelastic membrane to serve as a "once-only" valve. A PoP valve can be formed by controlled laser treatment, where depth etching techniques generate a thin membrane region onto a thicker support film (type I). This laser generated thin membrane can measure <10 microns and will rupture when under the action of a force—such as moderate liquid pressure. A variation of this structure is a laser generated valve using an "over-etching" procedure to demark a porous orifice. A PoP valve is then formed by the inclusion of a polymer plug (type II). Type (II) valves are constructed with liquid polymer materials such as polystyrenes or polycarbonates or siloxanes, etc, dispersed into a solvent vehicle.

A microliter solution of the polymer (<2 μl) is dropped onto the laser over-etched area to plug the openings in the material. Liquid polymers are applied to the laser machined materials by thick-film printing methods or even liquid drop injection from a convenient solvent system.

Valve sizes are typically equal to channel width and often circular in form (dia. 1 mm) and <2 mm length—valve surface 2 mm². Other PoP valve geometries are envisaged.

Figure 10:
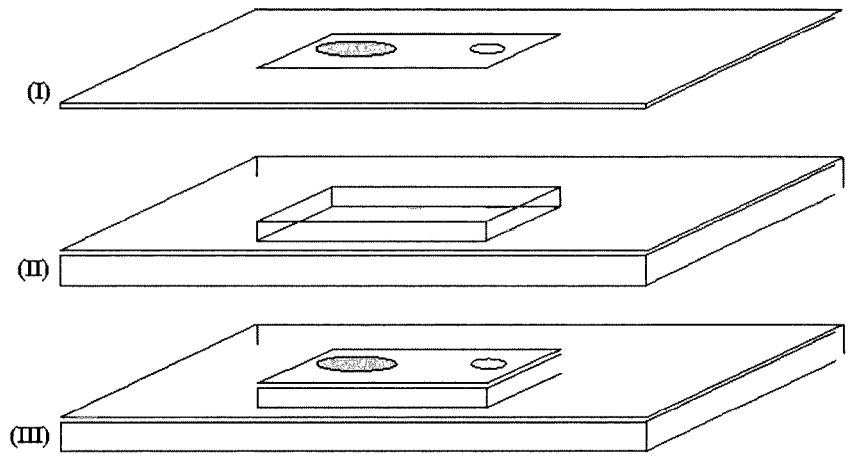

FIG. 10. Construction of a liquid cavity. A laser etched upper film/laminate with etched valve region (I) is bonded by adhesive laminate, thermal bonding or ultrasound welding to a base material (II), to form a laminate film with a sandwiched cavity. Illustration (III) shows a laminate with a sealed cavity housing a pressure-sensitive pad and single-use valve in the upper film.

Figure 11:
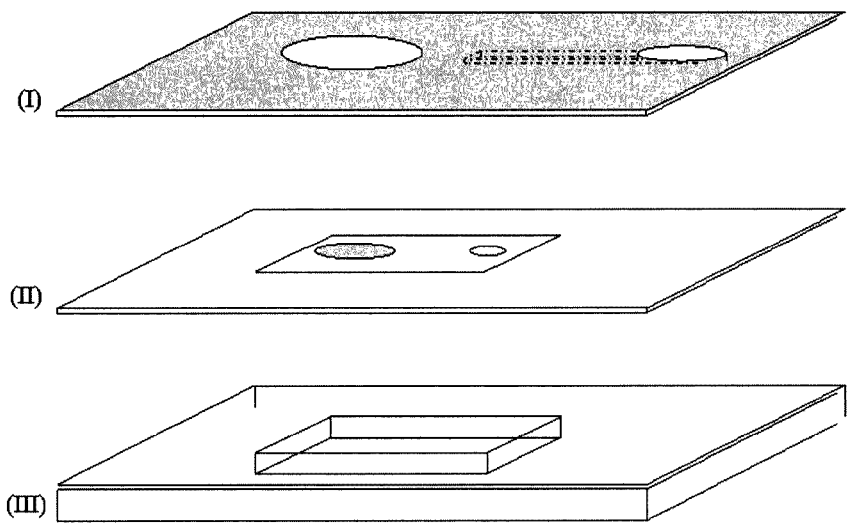

FIG. 11. The illustration above shows a capillary-channel laminate with etched capillary channel and openings for liquid sample and touch pad actuation pin.

Figure 12:
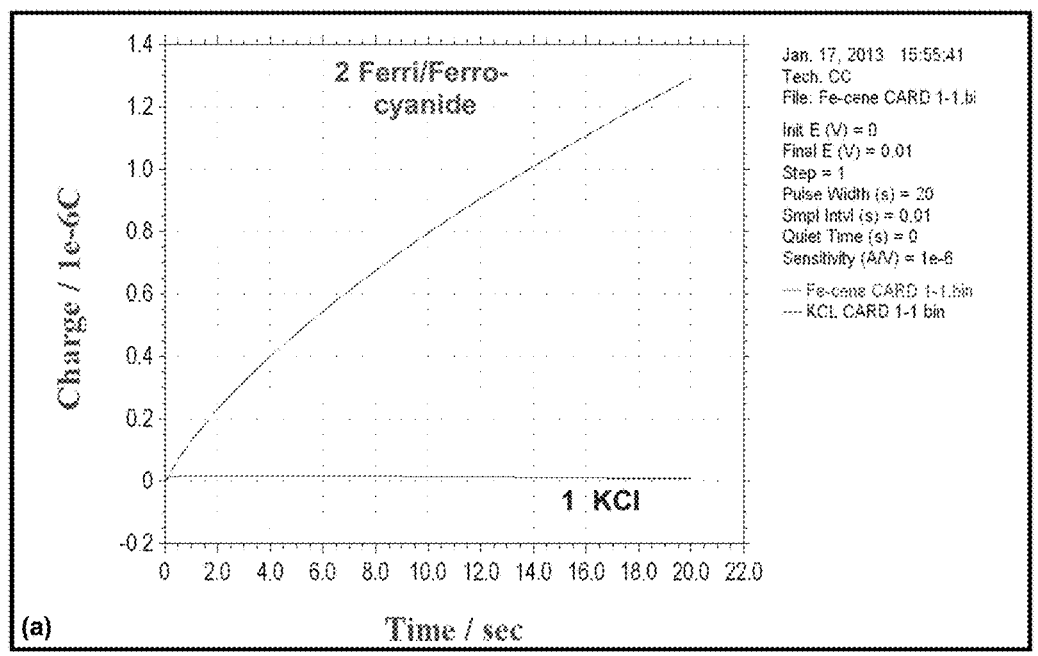
Figure 12:
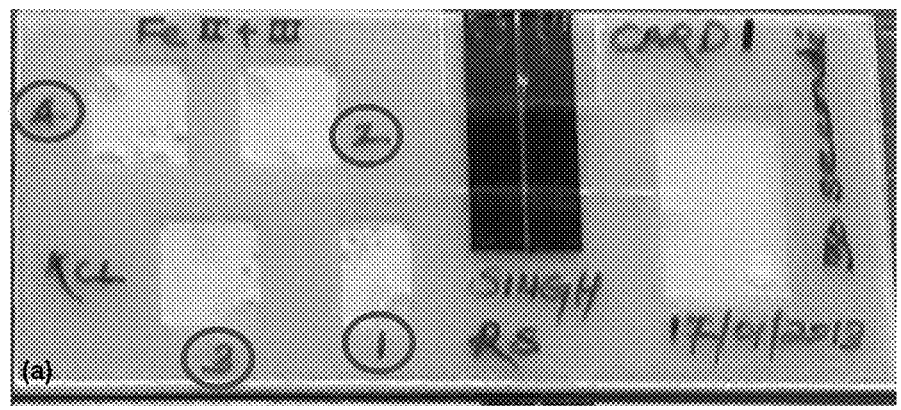
Figure 12:
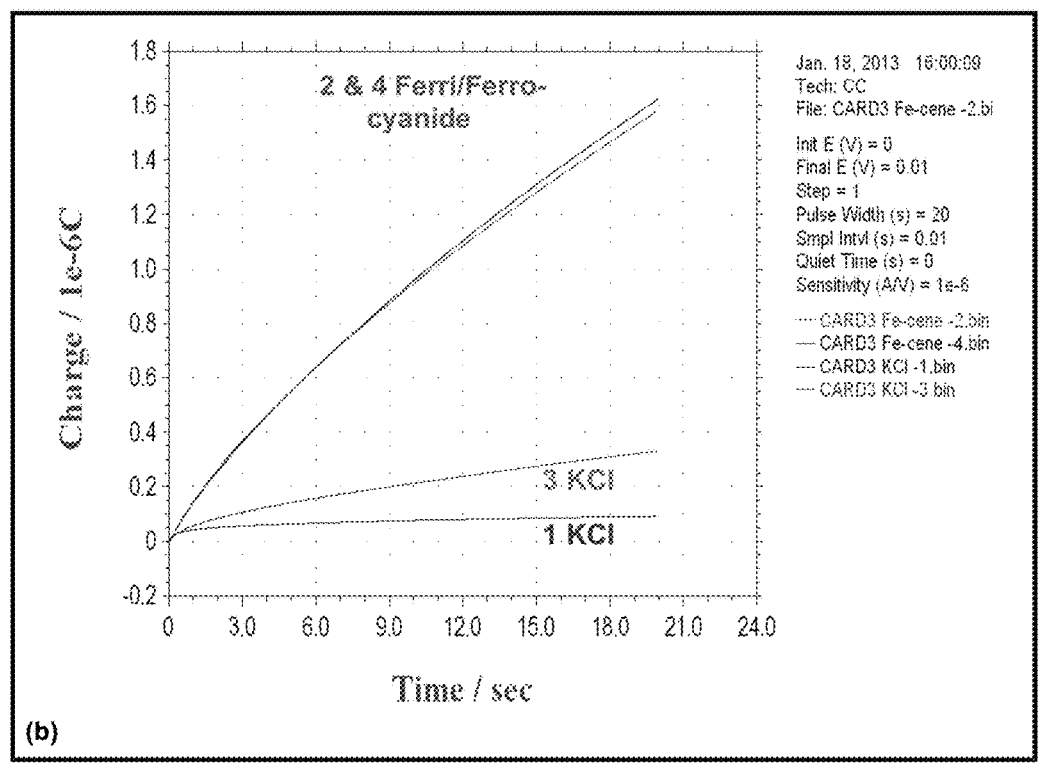
Figure 12:
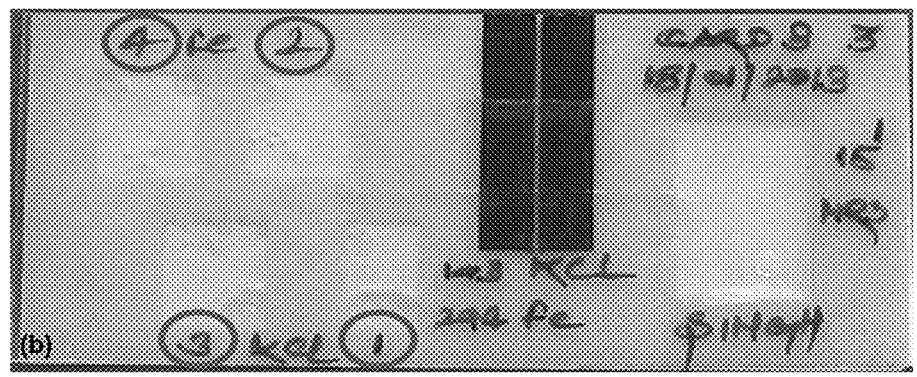
Figure 12:
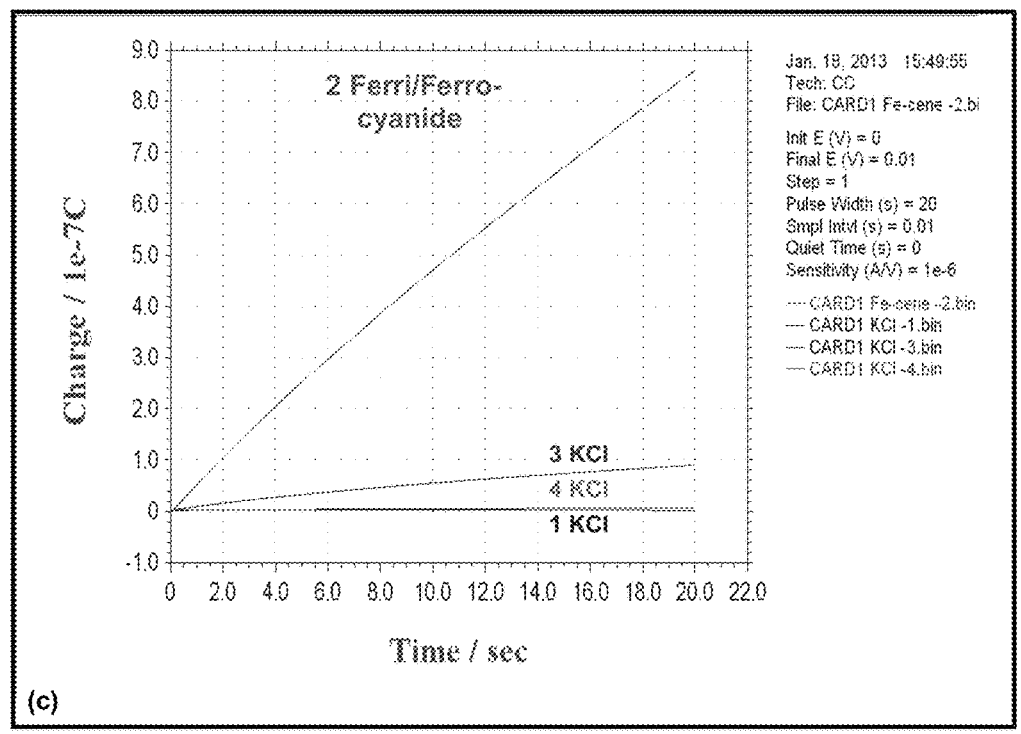
Figure 12:
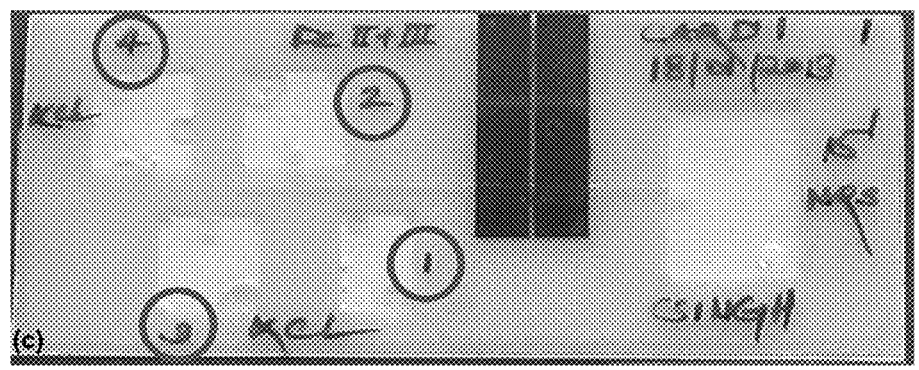

FIG. 12. Demonstration of consecutive flow fluidic Mechanism I delivery on-card with redox test species. Cavities 1 & 3 were filled with KCl (Blank, 0.1 M KCl), while cavities 2 & 4 were filled with Ferri/Ferro-cyanide solution. Time allowed following activation and prior to making the electrochemical measurement $(t_{ES})$=15 sec.

Figure 13:
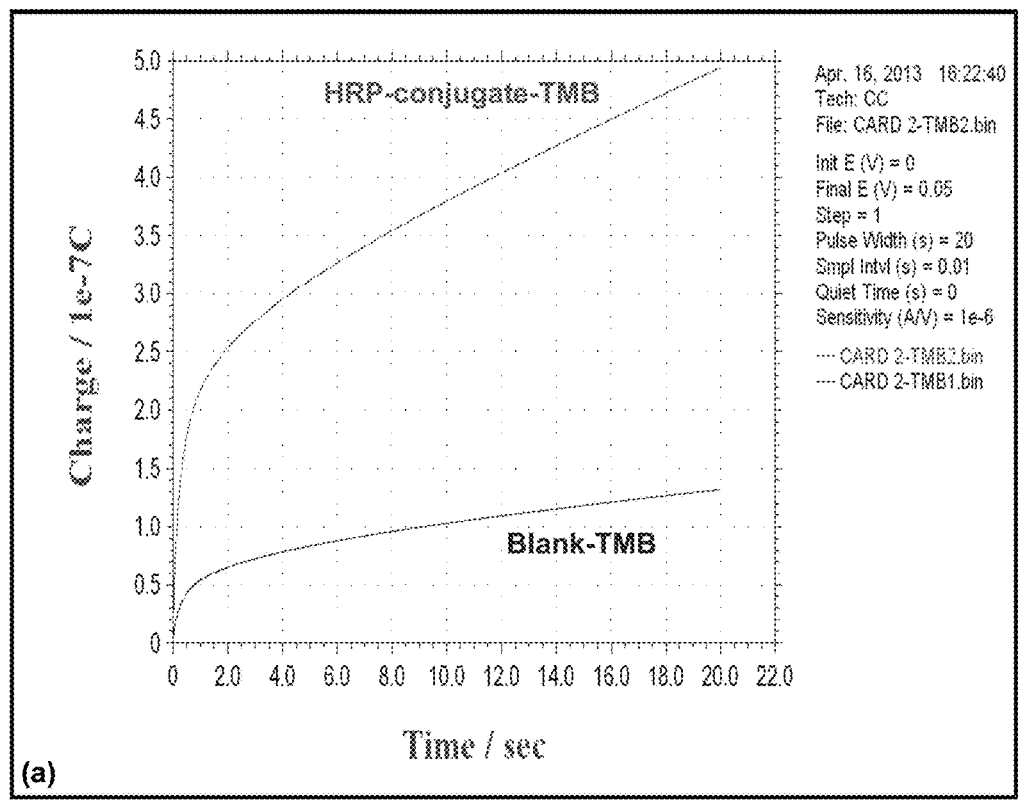
Figure 13:
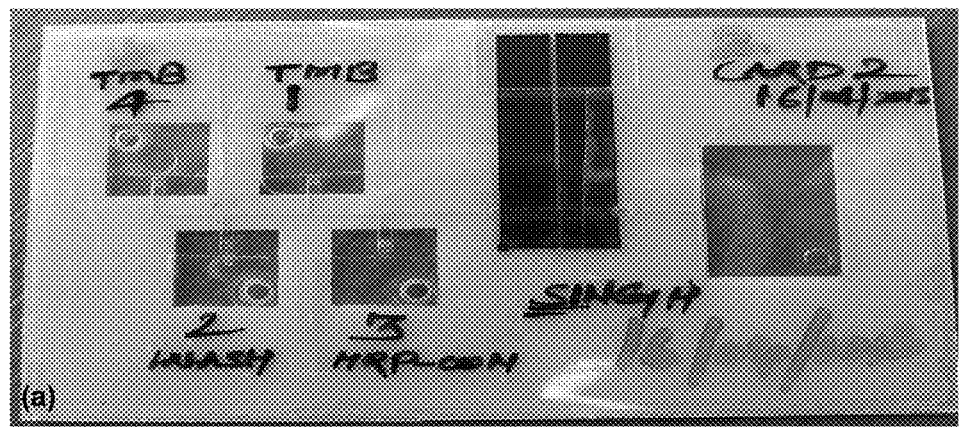
Figure 13:
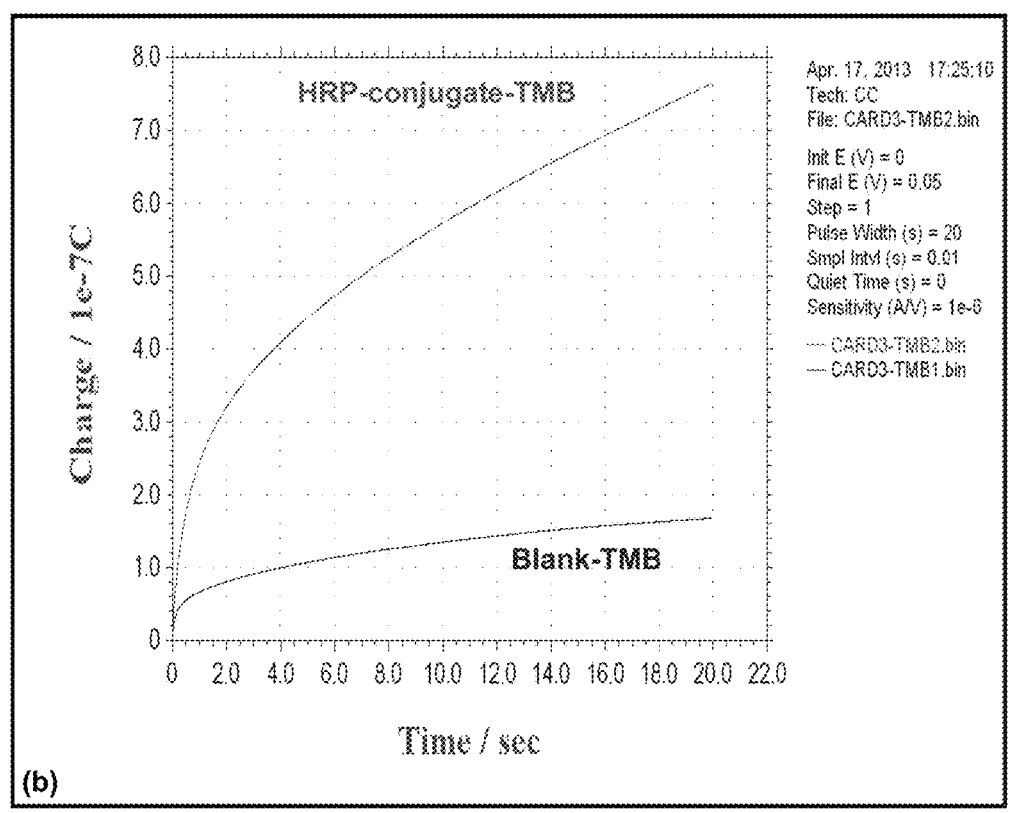
Figure 13:
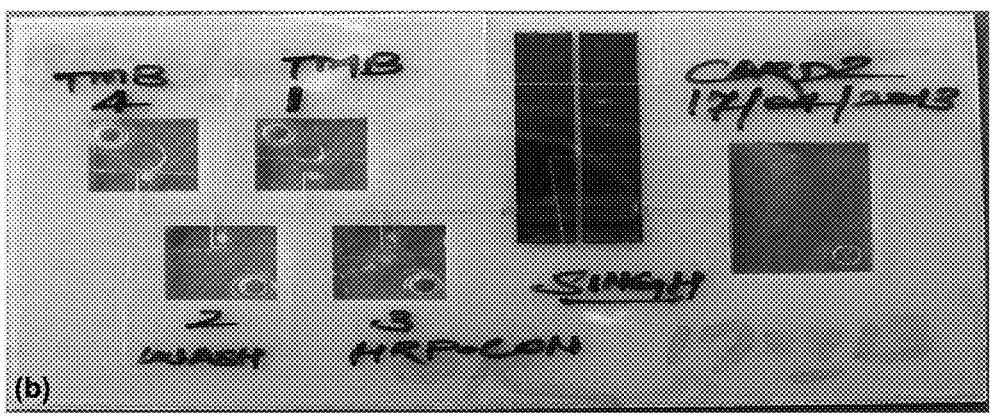

FIG. 13. Demonstration of consecutive flow Mechanism II (on-card fluidic delivery—ELISA reagents; HRP-conjugate-TMB as signalling reagent and TMB as blank). Cavities are labelled (1 & 4—TMB and 2—wash and 3—HRP-conjugate).

DETAILED DESCRIPTION OF THE INVENTION

Analytical fluidics' technologies utilise a variety of liquid delivery motifs to assist in the mass transfer, separation and mixing of liquids, including electro-osmotic and thermo-pneumatic flow. The present invention is based on fluidic compression or micro-hydraulic principles to induce controlled hydrodynamic flows. The concept is considered a reliable and simplified approach to micro and meso-fluidic delivery. The device requires the application of a small fingertip force for activation, thus reducing the requirements for complicated pump and valve components associated with other micro-volume reagent-delivery technologies. Design and engineering complexity for any analytical device or fluidic system is therefore greatly reduced.

The present invention relates to a device to store and transfer chemical reagents such as liquids in small-volume amounts within a thin-layer membrane structure. The invention encompasses a means to stabilise micro-liter volumes (i.e. ≤500 µl) of liquids and particularly aqueous reagents in thin-layer cavities. The concept allows controlled point-to-point delivery of reagent by the actuation of a micro-force to a pressure-sensitive surface. This programmed liquid movement is only actuated once the membrane is "touched" at specific loci on the device surface—achieved manually or automatically by the action of a low-pressure force. The mechanism of action of membrane touch includes both liquid injection and liquid suction, providing dual functionality and utility to devices such as a micro-injector or micro-pump.

(i) Micro-injector—In this mode a cavity is filled with liquid reagent which can be dispensed to other parts of a fluidic system by the application of minimal "touch pressure".

(ii) Suction Pump—Operates by suction pressure allowing a liquid sample or reagent to be directed to other parts of a fluidic system, such as a capillary channel or chemical reactor or detector cavity.

The present invention solves problems traditionally associated with the physical stabilisation and movement of liquid reagents within narrow layers (<200 µm), eliminating the necessity for complex valve components or similar liquid retention devices and associated methodologies. The present invention ideally provides a means of controlling and releasing stored micro-volumes of liquid reagent by introducing an in-elastic polymer film to overcome the capillary forces within thin-layer channels. This structure is in effect a single-use valve and in the current invention this is preferably fabricated by laser etching techniques. Reagents are made to flow by the application of a small force exerted at a pressure-responsive area (touch pad) formed onto an intermediate polymer membrane. Increased liquid pressure activated by the touch pad "blows" the valve and induces liquid flow in and optionally beyond the capillary channel.

A major arena of utility of the invention is sequential and timed chemical reactions and chemical analysis, where reagent changes are often required. Specifically, the invention applies to molecular analysis, such as involving enzymes and antibodies, for example in an immunoassay and bioassays where biological cells such as bacteria and human cell lines are part of the analysis scheme. In this instance, the cartridge of the invention may extend to laboratory and mobile chemical analysis applications, where the technology is integrated with a detector and engineered on plastic, glass, silicon or ceramic chips. The invention is of particular value in the design of a mobile ELISA device for in-field bio-analytical use.

Four components embody a basic membrane touch device. They are:
(i) cavity—liquid or gas filled,
(ii) pressure sensitive membrane—touch pad,
(iii) a single-use valve, and
(iv) a micro-capillary channel.

The design and fabrication based on laser manufacturing techniques for each of these components will be discussed.

Design and Structure

Figure 1:
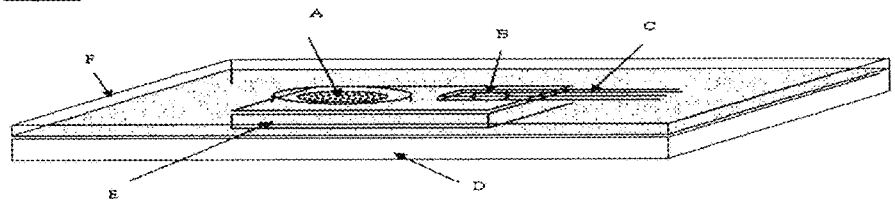
FIG. 1. Side view of a membrane touch device showing the main design elements. (A) pressure-sensitive "touch" pad, (B) PoP valve, (C) capillary channel, (D) base material, (E) reagent cavity and (F) channel laminate.
Figure 2:
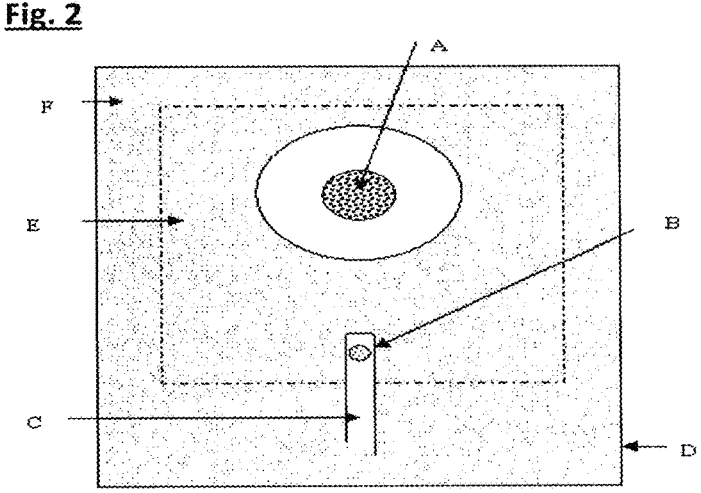
FIG. 2. Top view of a membrane touch fluidic device displaying the arrangement of a (A) touch pad, (B) PoP valve and (C) capillary channel system, (D) base material, (E) reagent cavity and (F) channel laminate. The illustration shows a device measuring 15 min by 20 mm and a 10 mm section of a 1 mm capillary channel. The white circular area around (A) demarks a rigid upper layer exposing only the touch pad.
Figure 3:
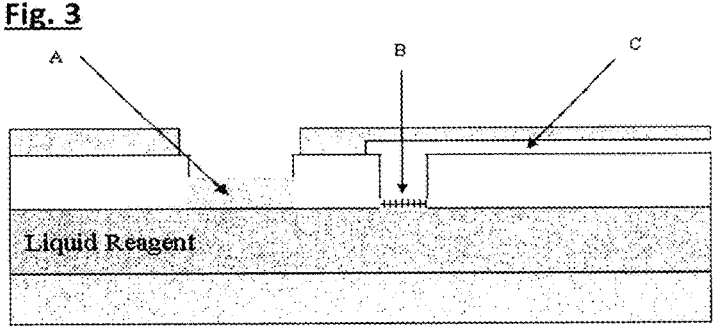
FIG. 3. Design of a basic membrane touch fluidic operating as a simple reagent micro-injector. Above is the device before external force actuation. Liquid reagent is confined to the cavity region of the membrane with pressure pad (A), PoP valve (B) and capillary channel (C).

A basic type of cartridge of the invention consists of a micro-volume cavity sandwiched within a film layered structure. The cavity is primarily intended to hold a liquid reagent such as an aqueous solution, but it could be the site of a gas reservoir, or even a depository of powdered solids or surface immobilised molecules. Cavity dimensions are variable, but typically of millimeter scale, e.g. 10 mm×10 mm. The depth of the cavity is variable, typical size ranges from 0.1 mm to 5 mm. Such cavities can hold liquid volumes between 100 µl to 500 µl. However, the laser fabrication method described is capable of construction of micro-structures such as "micro-cavities" storing fluids of less than 1 µl. Many other cavity designs and dimensions are possible with the fabrication methodology; e.g. rectilinear (10 mm×30 mm) and circular cavity (dia.≥1 mm) designs; with cavity volume capacities exceeding 500 µl. Design and structural characteristics of one such device with a square-shaped liquid cavity is shown in FIGS. 1 & 2. In addition to a sealed fluidic cavity, membrane touch requires three other components to complete the basic design:
(i) pressure-sensitive surface (touch pad)
(ii) "pulse-of-pressure" valve (PoP valve)
(iii) meso or micro-capillary channel The touch pad surface may be as large as the cavity itself, or as small as 1 mm in diameter with circular cross-section. Other touch pad designs are envisaged—all respond to external force actuation, either manually by hand, using a finger or point stylus, or automatically, e.g. by way of electromagnetic pin actuators.

Cartridge as a Liquid Reagent Micro-injector

The primary function of a cartridge of the invention is to store and dispense small-volume liquid reagents to other parts of a fluidic system. In this sense the device behaves as a micro-injector. The cartridge of the invention can perform several types of delivery function such as the release or injection of reactant substances or analytical reagents for chemical tests. Liquid reagent stored in a holding cavity is forced through a valve into a capillary-channel line. In this way, low micro-liter or even sub micro-liter volumes of liquid reagent can be injected out of the cavity or to other loci within a complex fluidic network. For example reagents could be injected into other types of cavity such as a chemical reactor chamber or microwell chamber, or detector chamber. Indeed, for complex fluidic systems needed for chemical analysis, different types of cavity are recognized, such as a "sample cavity" to store and inject sample specimens and a "sink cavity" to collect the spent reagent. For immunoassay applications, e.g. ELISA—a "wash cavity" containing high volume buffer-wash reagents (>100 µl) is needed as well as a "conjugate cavity" to supply<20 µl of, for example, enzyme-complexed antibody, and enzyme substrate reagent in cavity<20 µl. In this specification the enzyme could be horseradish peroxidase, glucose oxidase, alkaline phosphatase or beta-galactosides, etc. The conjugate could be not only composed of antibody but also molecules and fragments recognised as antigens.

Figure 4:
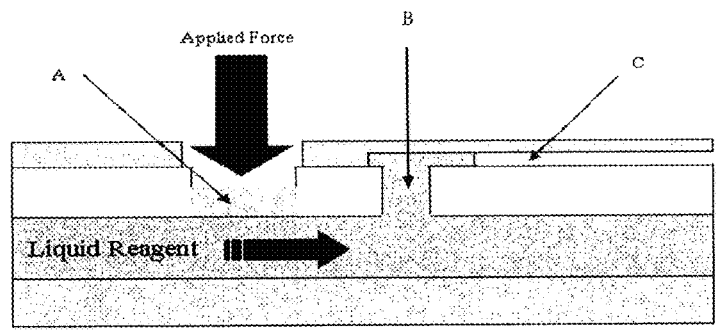
FIG. 4. Membrane touch micro-injector after actuation of a force to the pressure-sensitive pad (A). The illustration shows the affect of PoP valve rupture. This leads to fluid flow through the valve (B) and into the capillary channel beyond the cavity (C).
Figure 5:
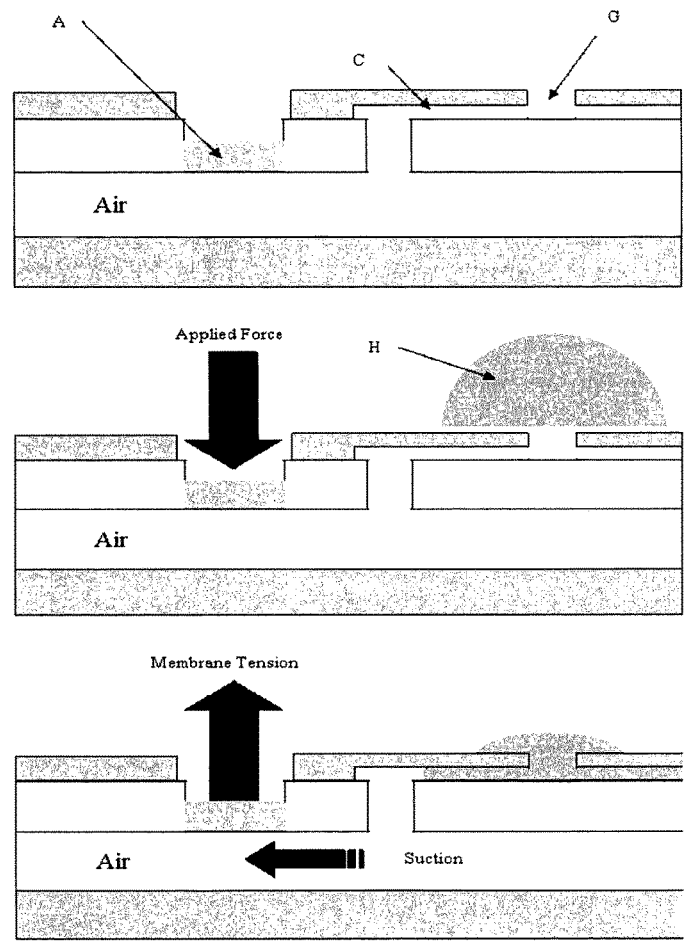
FIG. 5. Cross-sectional view of a membrane touch device performing a suction micro-pump function. Application of an external force at the pressure-sensitive pad (A) and subsequent release draws liquid sample or reagent (H) from one part of the device—shown here near a sample port (G, and externally connected orifice)—to another. The liquid is shown being forced into capillary channel (C) and could be passed on to other cavities within the fluidic device.

A cartridge of the invention adapted to perform a liquid or reagent injector function is illustrated in FIGS. 4 & 5. Once an external force (finger or mechanical pin) is applied to the resiliently deformable flexible region (touch pad) of the intermediate membrane, this membrane deforms and exerts a pressure on the liquid cavity. Fluid compression is transmitted by "hydraulic effects" to other parts of the liquid-filled cavity including structures around a valve component. The valve is indeed another pressure-sensitive surface located in a covered region of the cartridge. The valve in this feature consists of a micrometer-thick polymer film (typically <10 µm), which experiences a pressure pulse sufficient to break the film and so force liquid out of the storage cavity and into the capillary channel regions beyond the cavity. Liquid compression and pressure amplification at the valve region is achieved by "funnel cavity design" such that a valve is sited in a narrow section of the liquid holding cavity. By exerting the correct applied force to the flexible membrane—magnitude and time dynamic (e.g. pulsed or constant), controlled release of liquid volumes from cavities at the microliter level (e.g. 5 µl to 100 µl) and flow rates>10 µl/s or ≤100 mm/s, can be attained.

Cartridge as a Simple Suction Pump

The cartridge of the invention can also act as a simple liquid micro-pump which is manually or automatically (e.g. electro-mechanically) operated. The mechanism of operation of the device involves gas (e.g. air) within the fluidic cavity being displaced by say fingertip pressure. This generates a low pressure region "vacuum" within the pump cavity enabling smooth delivery of a liquid sample or reagent to other parts of the fluidic device (simple membrane touch or complex fluidic system). Cartridges of the invention have demonstrated high fluid flow capacities and in tests show steady and uninterrupted displacement of fluid from one part of a fluidic system to another. Pump cavities, capillary channels and sample ports (G) have been constructed with capacities of 10 µl or less by laser-laminate techniques. In this instance, linear flow rates of fluid reagents, water and biological liquid samples have been measured at 50 mm/s, once activated by a 10 µl capacity membrane touch pump. Membrane-based suction micro-pumps are capable of drawing liquids along channels of dimension 0.5 mm×0.25 mm×150 mm in a few seconds. It is envisaged that cartridges of the invention will perform complex and programmable fluid flow functions within a membrane-based chemical analysis system.

A cartridge of the invention functioning as a suction pump is illustrated herein. This device would be useful for liquid sample and reagent transfers into a capillary channel or cavity. Shown is a liquid drop placed on to the upper surface of a device and across an open orifice—e.g. a sample port (G). The drawing shows the action of liquid suction once the pressure pad is held down and then released. If a liquid is placed at the sample port, this liquid is sucked into the connecting capillary channel by the drop in pressure caused by elastic return of the pressure pad. This process is rapid and in the drawing shown would result in liquid entering the cavity space. If sufficient liquid is placed at the sample port then for a moderately applied force, the cavity will completely fill with liquid. Equally, the liquid to be transferred could already be stored within a holding cavity until the membrane touch pump actuates and draws micro-volumes of liquid away from the holding cavity to another location, or cavity, or other part of a fluidic network. This micro-pump in addition to aiding transfer of liquid may also be part of a more general feature involving a filter device for preliminary chemical reaction or specimen or sample treatment.

A PoP valve (not shown in this illustration) could also form part of the micro-pump structure enclosing or trapping a given gas atmosphere in the cavity component of the device. As with the micro-injector, the valve would break on application of fluidic pressure so allowing fluids to flow freely across the valve.

Construction Methodology

Cartridges of the invention consisting of micro-injectors and micro-pumps are fabricated primarily using laser etching-drilling methods in combination with laminate ultrasonic bonding techniques. These are the preferred processes for the cartridge of the invention, since they are "dry" machining methods which can be easily scaled to meet manufacture. However, it is realised that high-volume manufacturing processes for complex cartridges may involve a combination of processes in order to construct one or more elements of the assembly.

Liquid cavities are composed of two sections: (i) a base material on which recessed structures are formed (i.e. open cavity) and (ii) an "upper film" with pressure-sensitive properties. The latter closes or seals the cavity.

Cavities can be incorporated into a base material in several ways, including plastic-moulding processes, or 3D printing. A favourable method is laser etching where a polymer-film or sheet material such as cellulose polymers, polycarbonate, polyethylene terephthalate, polyethylene, polystyrene, polyimide, etc is machined. Base material thickness, typically 1 mm to 5 mm, is laser machined to provide liquid-holding recesses. One such base material with laser cavity recess which can be made by laser machining is illustrated in FIG. 5. In this case a square-shaped open cavity is constructed in the base material. Typical dimensions: 10×10 mm and 10 µm to 500 µm depth. Other recessed structures for cavities are possible, such as circular cross-section for cylindrical cavities. The laser machining process relies on control of a high energy light beam. In tests with a $CO_2$ "thermal" laser, cavity dimensions and tolerances are controlled by several machine characteristics including; pulse frequency and beam translational parameters. The "quality" of laser machined structures, e.g. absence of charring—is specific to material's chemical and physical characteristics.

Figure 6:
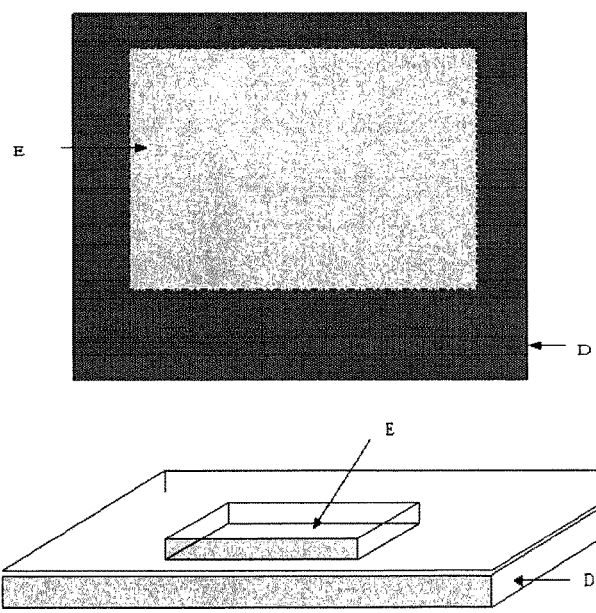
FIG. 6. Above illustration: top view of a laser machined cavity in square form. The lighter grey region depicts the bottom of the cavity, while darker areas demark the upper surface of the material (not laser treated). Lower illustration is a side section of the base laminate showing the recessed cavity (E) machined into the base material (D).
Figure 7:
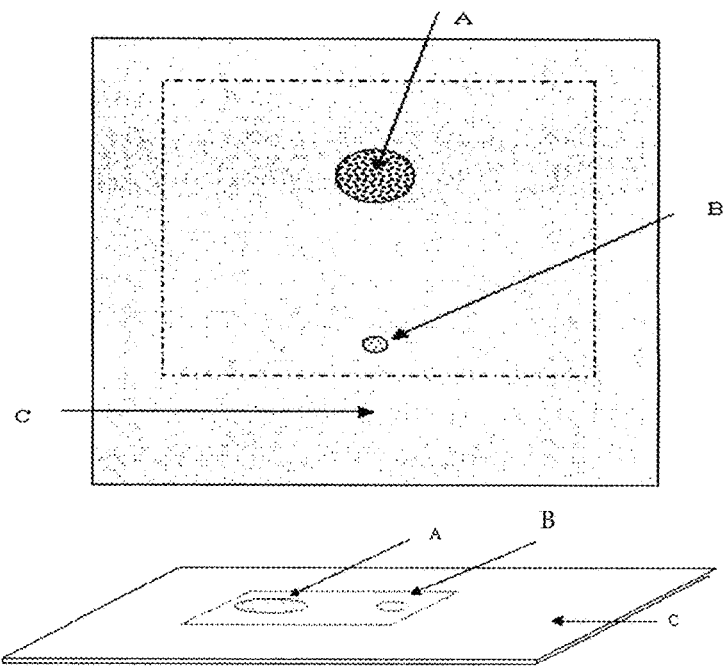
FIG. 7. Illustrations of the membrane touch film showing the pressure-sensitive pad area (A) and single-use PoP valve (B), and the location of capillary channel (C). Above: top view of a membrane touch film, dashed lines demark the cavity space. Below: side section of the upper film showing the two laser machined areas (A) and (B) forming the touch pad and PoP valve respectively.
Figure 8:
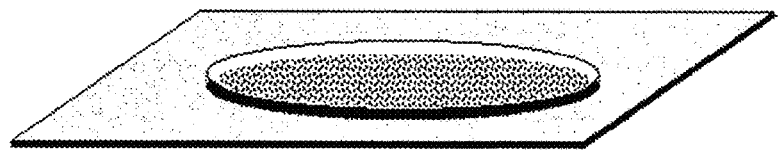
FIG. 8. Structure of a disc-shaped pressure-sensitive pad. In this form the pad has recessed, pressure-sensitive diameter of 5 mm and is formed in a polymer film of 200 μm thickness with recess depth 150 μm. The 50 μm thickness pressure-sensitive pad is actuated by an external pin.

An intermediate layer (upper film) is laser machined to construct a seal for the open cavity. Again the material of choice varies depending on function and application. Film materials include; cellulose polymers, polycarbonates, polyesters, polyethylenes, polystyrenes, polyimides, etc of thickness <100 µm. This film also functions as a pressure-sensitive membrane. The upper film utilises an otherwise rigid material which after exposure to laser light beam renders parts of the surface flexible to deformation. Deformable areas are of two types: (a) a film area which is elastic and deforms when an external force is applied, and (b) a thin film which is inelastic and ruptures on deformation. A pressure-sensitive membrane illustrated in FIG. 6 is fabricated by laser etching techniques. The lower (open cavity) and middle (upper film) sections are aligned and bonded together as a laminate, entrapping a fluid cavity. Film bonding procedures applied to prototype devices have utilised thermal and chemical adhesion. Dry bonding processes are envisaged and particularly ultrasound bonding to form a liquid-tight seal between base and upper film.

The final part of the construction of a cartridge of the invention involves a capillary-channel laminate (top layer). This is a film having an etched (open) capillary channel which is then aligned and sealed onto the intermediate layer (upper film, pressure sensitive) of the cavity. The material may include; cellulose polymers, polycarbonates, polyesters, polyethylenes, polystyrenes, polyimides etc. of film thickness typically 50 µm to 250 µm. The capillary channel laminate may also possess other laser machined features, such as openings of mm dimension for sample port orifices and for touch pad actuation.

Base Layer a laser fabrication scheme for a liquid reagent cavity is shown in FIG. 6. Here control depth etching by a laser beam can render recessed patterns in a wide range of organic polymer film. For base material manufacture—surface recesses in various shapes and depths can be formed—a square cavity is depicted in FIG. 6. The depth and shape (circular, teardrop) of the cavity can be varied depending on material type and laser etching programme. The cavity depth can be gauged to 100 s of microns tolerance and measure several millimeters in a planar dimension. Typically a cavity to inject 10 µl to 100 µl of reagent would be constructed with dimensions, e.g. 10 mm×10 mm×0.1 mm, to hold sufficient liquid capacity for the micro-injector application.

Machining is accomplished by laser depth etching techniques which can be achieved with a low-energy industrial $CO_2$ laser cutter. The etch-machining characteristics of the drilling are related to the duration of laser exposure, light pulse frequency and energy, as well as raster rate (translational movement of the beam) over the work surface. Fine detail can be achieved with etch tolerances of +/−10 µm. This tolerance is sufficient for most meso-fluidic membrane touch applications. The open cavity base part is readily machined from PET films (425 µm thickness) and laminates with etch depths 100 µm to 350 µm.

Liquid reagents can be introduced to the cavity at this point in the fabrication process, or at some later stage such as following inclusion of the upper film. Liquid reagents may involve low (1 cP) and high viscosity (1000 cP) formulations dispensed by micro-drop robotic dispensers. Alternatively, rupturable thin-film pouches or liquid entrapped micro-capsules made of gelatines or carrageenans can be prefabricated and inserted into the open cavity pre-sealing. Equally, a liquid, gas and powder-solid reagent can be introduced at other steps in the membrane touch fabrication scheme.

Laser machining procedures are utilised to construct the intermediate layer (upper film) with pressure-sensitive areas on an otherwise ridged thick-film material. Utilising the technique of controlled depth etching with laser light, micrometer layers of material are removed from the surface to leave a thin liquid-impermeable membrane of some 2 µm to 150 µm thickness. This region of film is pressure sensitive and will elastically or in-elastically deform readily on the application of an external force such as the press of a finger or the action of a pin. The type of deformation will depend on the material type, the thickness of the laser-machined membrane and the magnitude of the applied force. Two components are laser machined onto the membrane touch film, (i) a touch pad and (ii) cavity valve.

Touch Pad (Resiliently Deformable Flexible Region)

A pressure-sensitive pad or touch pad is necessary for liquid movement from a cavity to a capillary channel and beyond. The touch pad component provides a means to transfer cavity-held liquids out of the cavity and into a capillary channel, or to some other location in a more complex fluidic network. This pressure pad component is laser machined in the same way as the liquid cavity by controlled depth etching. Again material type and laser drilling parameters are important to the dimensional tolerance of final component. Pads are recessed typically by 10 µm to 100 µm as a consequence of the laser machining processes.

Touch pad components allow fluid actuation to be accomplished manually by finger tip touch or stylus pressure. Equally, automatic fluid actuation can be achieved by external "push" pins. In tests pin actuation (1.5 mm pin dia.) at a 10 mm×10 mm membrane touch device injected aqueous reagents of the order of 25 µl.

Cavity (Rupturable) Valve

A valve system is preferable to stabilise liquid reagent held within a cartridge of the invention as well as to control the flows of liquid reagent from the pump chamber to other parts of the cartridge during device operation. Indeed, for each channel line, a valve acts to control liquid flow along connected channels to other cavities in any given device. A valve is normally positioned at the injector outlet. Without actuation of a force at the touch pad, the valve remains in a closed state. The thin membrane barrier prevents liquid flows down the injector channel lines, which would otherwise result in uncontrolled sample or reagent mixing. A single-use valve such a pulse-of-pressure (PoP) valve operates on in-elastic deformation principles. That is, a thin-film material which once passed its elastic point will rupture. The valve is then open; a state which is irreversible. This restriction of a thin membrane is powerful enough to resist low-pressure aqueous liquids in meso-scale fluidic capillaries and channels and so offers a simple means to control micro-volumes of liquids prior to injection.

Once a pressure force is applied to the aqueous solution (via the flexible touch pad), liquid reagent may overcome the valve membrane resistance and flow into and through the capillary channel. The same valve principle prevents sample flows to other parts of the meso-fluidic device. All such PoP valves are activated—"opened"—by a pressure force exerted on a flexible membrane in the injector cavity. The action of this force pushes liquid across a membrane valve and into the channel.

In trials, it was found that pressures needed to drive aqueous liquid through a valve from injector cavities defined herein are typically a "light finger touch"—this force is enough to eject >25% of the injector capacity out of the cavity and through connecting channels to a microwell chamber or cavity. This fluid movement occurs in seconds. If a constant force at the cavity touch pad is applied, this is enough to drive liquid flows from the reagent cavity to the other cavities such as a microwell chamber, emptying the reagent injector within 2 minutes. Liquid reagent flow rates depend on the cavity dimensions and geometry as well as other fluidic components including characteristics of the valve.

Figure 9:
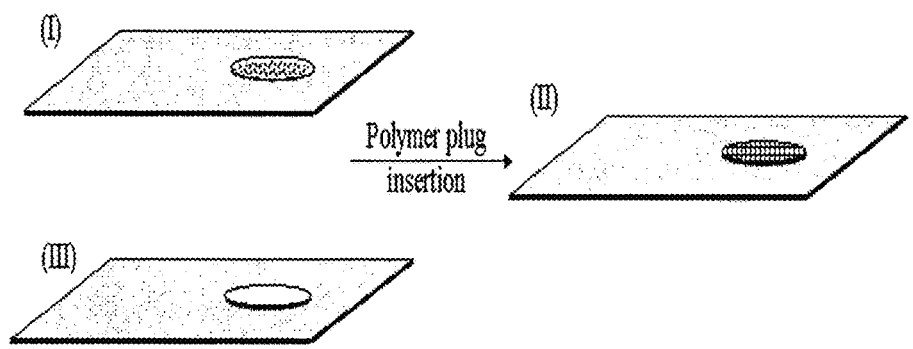
FIG. 9. Fabrication methods for the formation of membrane touch-PoP valves by laser machining and liquid polymer sealing. The scheme shows two types of valve, one prepared by laser etching only (I) and a second by laser etching with polymer plug (II). Film (III) has a laser drilled hole which can be sealed with a polymer plug to form a PoP valve similar to type (II).

For a simple micro-pump function the valve area would simply consist of a polymer plugged etched region or etched region alone such as that labelled as (II) or (I) in FIG. 9.

Liquid Cavity Laminate

A liquid cavity such as the one depicted in FIG. 10 is assembled by fixing an intermediate membrane (upper film) as described to a laser-machined base material with etched cavity. This forms a dual laminate construction with a hollow or liquid-filled cavity. Importantly, this laminate features a pressure-sensitive upper membrane with touch pad and valve regions.

This laminate must feature a liquid-tight seal, in order to retain liquid reagents under low pressure. One of several film-bonding procedures can be used to form such laminates including the use of chemical adhesive materials and adhesive tape films. Alternatively, a low-temperature thermal sealing method can be applied to form sealed cavities, e.g. polyethylene laminates are used to construct liquid-tight cavities.

A favoured processing scheme utilises ultrasonic welding or bonding techniques for liquid-seal laminate construction. This method allows rapid, low-temperature, dry bonding of many types of polymer material and the process can be easily integrated with other dry-processing stages and scaled to meet volume production needs.

Capillary Channel Laminate

This fabrication stage essentially completes the manufacture of a basic cartridge of the invention. In this stage a capillary channel is integrated with a sealed cavity unit to form a completed device which can perform a simple liquid injection or suction function—i.e. a liquid micro-injector or micro-pump.

Into a film polymer material micro-etched channels (<200 µm depth) and millimeter-scale output orifices (<3 mm dia) are introduced by laser treatment. Channel length is typically millimeter-scale, e.g. 10 mm, in single line, network or complex geometic form. Membrane touch fluidics have been fabricated using laser-laminate techniques with variable channel volumes ranging from 35 nl to 10 µl. These channels are successfully demonstrated in micro-injector devices.

Capillary-channel laminates are bonded to the sealed cavity laminate by similar methods described previously for the liquid cavity laminate—again ultrasonic bonding being a favoured technique. As an alternative procedure, it is envisaged that the capillary channel laminate could be bonded to the upper film first and this laminate then bonded to the open cavity.

The invention is not limited to the embodiments herein before described which may be varied in construction and detail without departing from the spirit of the invention.

Demonstration of Fluidic Delivery On-Card

The operation of the ELISA assay format cartridge (so called ImmunoTouch system) depends on the hydraulic fluidic mechanism referred to here as membrane touch. Here the hydraulic force is actuated by a pressure-sensitive membrane on a reagent cavity (using a finger or electromechanical pin). This hydraulic force establishes fluid translation called "consecutive flow" where one plug of reagent from a cavity is supplanted by another within a detector channel. The consecutive flow principle and thus the membrane touch operation was verified using standard redox reagents (ImmunoTouch consecutive flow fluidic mechanism-I) and ELISA immunoreagents (ImmunoTouch consecutive flow fluidic mechanism-II) prior to full ELISA on-card demonstration.

Microreagent Handler—ImmunoTouch Consecutive-Flow Fluidic Mechanism—I

An operational fluidic device was built and demonstrated based on a consecutive-flow fluidic mechanism. The flow concept was confirmed for the card using electroactive redox reagents (see FIG. 12).

Fluidic studies demonstrated the integrated operation of membrane touch fluidics and an electrochemical detector, the efficiency of wash sequences and reagent interactions at the electrode surface. Three experiments were conducted (raw electrochemical data, labelled a-c, FIG. 12) which demonstrate the capability of the integrated (membrane touch fluidics-electrochemical detection) system to distinguish a redox ferri/ferrocyanide signal from the background (KCl) signal irrespective of the order of reagent delivery. As expected, charge output at the detector was consistently HIGH for the ferri/ferrocyanide Fe(II)/Fe(III) signal prior to and following delivery of background reagent potassium chloride (KCl). The latter displaces the redox active Fe(II)/Fe(III) solution within the channel and ensures a detector LOW signal is re-established. Overall details of three experiments performed are as follows:

(i) The electrochemical response (charge vs. time plot) along with photograph of the assay card (FIG. 12($a$)) clearly demonstrates the capability of the proposed mechanism to distinguish the ferri/ferrocyanide signal from the background (KCl) signal (labelled in FIG. 12($a$)). Cavities 1 & 3 were filled with KCl (Blank, 0.1 M KCl), while cavities 2 & 4 were filled with Ferri/Ferro-cyanide solution and cavity actuation follows the sequence 1-2-3-4.

(ii) In order to check the reproducibility of the proposed system as well as confirming consecutive flow, repetitive measurements were recorded for both ferri/ferrocyanide and background KCl (FIG. 12($b$)). Cavities 1 & 3 were filled with KCl (Blank, 0.1 M KCl), while cavities 2 & 4 were filled with Ferri/Ferro-cyanide solution and cavity actuation follows the sequence 1-2-3-4 Electrochemical results herein (labelled, FIG. 12($b$)) demonstrated the capability of the system to differentiate the background signal (cavities 1 and 3) from ferri/ferrocyanide signal (cavities 2 and 4). A similar response was recorded for background (KCl) before and after the ferri/ferrocyanide signal at the same electrode surface using the same fluidic channel. In addition, the response for both background (KCl) and ferri/ferrocyanide signal was shown to be reproducible.

(iii) This experiment enables the effect of repetitive washing steps during the test application to be examined. The cavity actuation follows the same sequence 1-2-3-4 but in this case, cavities 1, 3 & 4 were filled with KCl (Blank, 0.1 M KCl), while Cavity 2 was filled with Ferri/Ferro-cyanide solution. The electrochemical response along with the photograph (FIG. 12($c$)) clearly shows that the background response (1KCl) recorded before the ferri/ferrocyanide delivery from Cavity 2, was successfully re-established following (, 3KCl and 4KCl) delivery of the redox reagent to the detector. Cavity 4 (4KCl) resulted in a signal which was almost identical to that of Cavity 1 (1KCl), clearly demonstrating that the system can measure a reproducible background signal to the same extent even following a HIGH analyte signal (from Cavity 2 Ferri/ferro-cyanide). This study also demonstrates that when the number of washings was increased (3KCl and 4KCl) the signal reproducibility was improved and the detector signal for 4KCl approached that of its original response (1KCl).

Overall, charge output at the detector was consistently high for the ferri/ferrocyanide Fe(II)/Fe(III) system-signal before and after delivery of background reagent potassium chloride (KCl). These experiments demonstrated (a) delivery of redox reagent from the cavities, (b) electrochemical detection verifying successful fluidic connection between cavity and channel, (c) successful integration of membrane touch fluidics and electrochemical detection system and (d) capability of the proposed integrated system to record reproducible responses. Such fluidic principles have allowed the development of a rigorous analytical device to be conceived for mobile ELISA use.

Microreagent Handler—ImmunoTouch Consecutive-Flow Fluidic Mechanism—II

The second approach which further demonstrates the consecutive-flow fluidic mechanism using membrane touch technology and electrochemical detector methodologies is described here. This experiment also demonstrates the capability of the proposed system to handle immunoreagents along with verification of consecutive flow principles. Horseradish peroxidase (HRP)-conjugate-TMB (signal) vs TMB (blank) reagent system was used and electrochemical responses showed differentiated signal (signal-HRP-conjugate-TMB) from the background response (blank-TMB).

Procedure

1. Reagents were equilibrated to room temperature and cavities (conjugate/wash/TMB cavities, labelled) were filled carefully with the immuno-reagents. The cavity openings were closed by applying sealing tape (after filling). Cavity actuation follows the sequence 1(TMB)-2(WASH)-3(HRP-conjugate)-4(TMB) as described in the following steps.

2. Activate the TMB cavity (Cavity 1) and hold for 1 min before activating the wash cavity.

3. Electrochemical measurements were recorded after 1 min (blank TMB FIG. 13(a)(b))

4. Activate the WASH (PBS 7.4) cavity (Cavity 2, time 20 s).

5. Activate the HRP-conjugate cavity (Cavity 3, incubation time 1 min)

6. Activate the TMB substrate cavity (Cavity 1, incubation time 1 min)

7. Electrochemical measurements were recorded after 1 min (HRP conjugate TMB FIG. 13(a) (b))

Overall the fluidic studies demonstrated the integrated operation of membrane touch fluidics and the electrochemical detector, the efficiency of wash sequences and reagent interactions at the electrode surface. As expected, charge output at the detector was consistently high for conjugate signal (HRP-conjugate-TMB) compared to blank signal (TMB). This experiment once more demonstrated (a) successful delivery of immunoreagents in the desired sequence from cavities (see FIG. 13), (b) electrochemical detection verifying successful fluidic connection between cavity and channel (HIGH response for conjugate signal compared to LOW response for blank signal). Such operational evidence of the microreagent device is fundamental to the development of a viable analytical device for portable electronic immunoassay applications.

The invention is not limited to the embodiments hereinbefore described which may be varied in construction and detail without departing from the spirit of the invention.

The invention claimed is:

1. A planar micro-reagent cartridge, comprising;
a base layer having a fluid receiving cavity formed in a top surface thereof and a fluid disposed within the cavity;
an intermediate membrane layer bonded to the base layer to seal the fluid receiving cavity and form a fluid reservoir pump chamber, the intermediate layer comprising a resiliently deformable flexible region that overlies the fluid receiving cavity and is configured to be depressed in response to application of pressure to cause an increase in pressure within the fluid reservoir pump chamber, and a rupturable valve region
that overlies the fluid receiving cavity,
is disposed only within the intermediate polymeric membrane layer, and
is spaced apart from the resiliently deformable flexible region,
the rupturable valve region being configured to rupture in response to an increase in pressure within the fluid reservoir pump chamber, wherein the rupturable valve region comprises a single use valve that once ruptured cannot be re-used; and
a top layer bonded to the intermediate layer, the top layer having an opening that exposes the resiliently deformable flexible region of the intermediate membrane layer and at least one channel that together with the intermediate membrane layer forms a fluid conduit having an inlet in fluid communication with the rupturable valve region of the intermediate layer, wherein depression of the deformable flexible region actuates the fluid reservoir pump chamber to rupture the rupturable valve region and pump fluid into the fluid conduit.

2. The cartridge of claim 1, wherein the fluid conduit comprises a capillary channel having an inlet in fluid communication with the rupturable valve region.

3. The cartridge of claim 2, wherein the capillary channel comprises an outlet in fluid communication with a reaction chamber.

4. The cartridge of claim 2, wherein the capillary channel comprises an outlet in fluid communication with a fluid outlet formed in a top of the top layer.

5. The cartridge of claim 1, having a thickness of less than 30 mm, 20 mm, or 10 mm.

6. The cartridge of claim 1, wherein the liquid receiving cavity has a volume of less than 1 ml or 500 µl.

7. The cartridge of claim 1, wherein the fluid reservoir pump chamber has a depth of 0.1 mm to 5 mm.

8. The cartridge of claim 1, wherein the base layer, the intermediate membrane layer, and the top layer are each, independently, formed of a material selected from cellulose polymers, polycarbonate, polyethylene terephthalate, polyester, polystyrene, or polyimide.

9. The cartridge of claim 1, wherein the fluid receiving cavity is formed in the base layer by laser etching.

10. The cartridge of claim 1, wherein the deformable flexible region of the intermediate membrane comprises an area of the membrane that is recessed compared to the rest of the membrane layer.

11. The cartridge of claim 1, wherein the intermediate membrane layer comprises at least two rupturable valve regions, and the top layer comprises at least two channels that together with the intermediate membrane layer form at least fluid conduits, wherein each fluid conduit has an inlet in fluid communication with a rupturable valve region.

12. The cartridge of claim 1, wherein the intermediate membrane layer comprises at least one multi-use valve region, and the top layer comprises at least one channel that together with the intermediate membrane layer form at least one fluid conduit.

13. A micro-reagent cartridge, comprising;
a thin base layer having a liquid receiving cavity formed in a top surface thereof and a liquid disposed within the cavity, the liquid receiving cavity having a volume of less than 1 ml;
an intermediate polymeric membrane layer attached to the thin base layer to seal the liquid receiving cavity and form a fluid reservoir pump chamber, and having a resiliently deformable flexible region which overlies the fluid receiving cavity and is configured to be depressed in response to application of pressure to cause an increase in pressure within the fluid reservoir pump chamber, and a single-use rupturable valve region that overlies the fluid receiving cavity, is spaced apart from the resiliently deformable flexible region and is disposed only within the intermediate polymeric membrane layer, and is configured to be ruptured in response to an increase in pressure within the fluid reservoir pump chamber caused by actuation of the pump chamber; and a top polymeric layer attached to the intermediate layer, the top layer having an opening that exposes the deformable flexible region of the intermediate membrane layer and at least one channel that together with the intermediate membrane layer forms a fluid conduit having an inlet in fluid communication with the rupturable valve region of the intermediate polymeric membrane, wherein depression of the deformable flexible region actuates the fluid reservoir pump chamber to rupture the valve region and pump liquid from the pump chamber into the fluid conduit.

14. The Cartridge of claim 13, wherein the single-use rupturable valve region comprises a recessed region of the intermediate layer and a removable plug that is inserted into the recessed region.

15. The cartridge of claim 13, wherein the single-use rupturable valve region comprises a hole in the layer that is filled with a polymer plug.

16. The cartridge of claim 15, wherein the polymer plug is a polystyrene and is less than 2 µl.

17. The cartridge of claim 13, wherein the single-use rupturable valve region is adapted and configured so that, after the valve region is ruptured, the valve region provides no resistance to liquid flowing therethrough.

* * * * *